Patented Apr. 11, 1933

1,903,645

UNITED STATES PATENT OFFICE

KARL STREITWOLF, OF FRANKFORT-ON-THE-MAIN, ALFRED FEHRLE, OF BAD SODEN ON TAUNUS, AND WALTER HERRMANN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

CROTONYL-AMINOBENZENE-ARSONIC ACIDS AND SALTS THEREOF

No Drawing. Application filed January 29, 1930, Serial No. 424,438, and in Germany September 8, 1928.

The present invention relates to crotonyl-aminobenzene-arsonic acids and salts thereof.

We have found that by the introduction of the crotonic acid group into amino-aryl-arsonic acids compounds are obtained which, compared with other acylamino-arylarsonic acids for instance the acetyl derivatives, show in spite of a reduced poisonousness an increase of the curative power. These acids can be prepared either by introducing the crotonyl group into amino-aryl-arsonic acids or by transforming nitro-crotonylamino-aryl compounds by way of the corresponding amino-crotonylamino-aryls into crotonyl-amino-aryl arsonic acids.

The new arsonic acids yield with alkalies, ammonia and organic bases, such as for instance ethanol amine, salts which are readily soluble in water and, according to the quantity of the base added thereto, the mono- or di-salts of the acids are obtained. In order to increase the stability of the solutions of these salts preferably small quantities of sodium sulfite are added thereto.

The new compounds correspond to the following general formula:

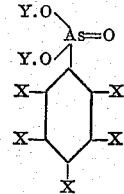

wherein one of the X's stands for the group —NH.CO.CH=CH.CH$_3$, the other X's for hydrogen or any univalent group and Y for hydrogen, an alkali metal, or NH$_4$ wherein three hydrogen atoms may be substituted by organic groups. They are therapeutically valuable agents and can be used either as such as remedies or as starting material for the preparation of other remedies.

The following examples serve to illustrate our invention, but they are not intended to limit it thereto.

(1) 214 grams of 3-amino-4-hydroxybenzene-arsonic acid are dissolved in 1 liter of normal caustic soda solution. After the solution has been cooled to 0° C. 120 grams of crotonyl chloride and 1200 cc. of normal caustic soda solution are simultaneously introduced drop by drop, the whole is stirred for a short time and 300 cc. of concentrated hydrochloric acid are then added thereto. The 3-crotonylamino-4-hydroxybenzene-arsonic acid thus separated is filtered by suction, washed and dried. It forms a white powder which is easily soluble in alkalies.

(2) 620 grams of 3-amino-4-hydroxy-5-chlorobenzene-arsonic acid, obtained by reducing the corresponding nitro acid (cf. Binc, Bauer, Hallstein, "Berichte der deutschen chemischen Gesellschaft" 53 (1920), page 422), are dissolved in 2.9 liters of normal caustic soda solution and the whole is transformed into the 3-crotonylamino-4-hydroxy-5-chlorobenzene-arsonic acid by means of 350 grams of crotonyl chloride and 3.5 liters of normal caustic soda solution, as indicated in Example (1). After the reaction is complete this acid is separated by addition of 870 cc. of concentrated hydrochloric acid. The 3-crotonylamino-4-hydroxy-5-chlorobenzene-arsonic acid is a white crystalline powder which is readily soluble in alkalies.

(3) By causing 199 grams of para-amino-benzene-arsonic acid to react with 120 grams of crotonyl chloride as indicated in Example (1), the para-crotonylaminobenzene-arsonic acid is obtained in the form of a white powder which is easily soluble in ammonia, alkalies or organic bases.

Other amino-substituted arylarsonic acids can likewise be transformed into their crotonyl derivatives in the same manner.

(4) The salts can be obtained in the following manner: 650 grams of the 3-crotonyl-amino-4-hydroxybenzene-1-arsonic acid obtained according to Example (1) are made into a paste with water and dissolved by the addition of about 147 grams of ammonia of 25% strength. The solution is filtered. 13 liters of acetone are gradually added to the filtrate (1300 cc.). After addition of about 4 liters of acetone the salt begins to crystallize out. The ammonium salt of the 3-crotonylamino-4-hydroxybenzene-1-arsonic acid is filtered by suction, washed with acetone and ether and dried in a vacuum. The salt crystallizes with 1 mol of crystal water. It forms a feebly yellowish crystalline powder which is readily soluble in water. The aqueous solution of this mono-ammonium salt shows an acid reaction to litmus paper.

(5) The 3-crotonylamino-4-hydroxy-5-chlorobenzene-arsonic acid obtained according to Example (2) is pasted in the wet state as it comes from the filter with water and dissolved by addition of aqueous ammonia of 25% strength. To the filtered solution is furthermore added a small amount of aqueous ammonia until blue litmus paper as well as red litmus paper are changed to reddish with a bluish shade. The solution thus obtained is mixed with 8 liters of acetone whereby the mono-ammonium salt of the acid is separated in a nearly pure white form. It is isolated and dried as indicated in Example (4).

(6) A solution of the amino salt prepared according to Example (4) can be obtained by dissolving for instance 10 grams of the salt after addition of 0.125 grams of crystallized sodium sulfite, adding to the solution aqueous ammonia until blue litmus paper as well as red litmus paper are changed to reddish with a bluish shade and then concentrating the solution as desired.

Instead of using the crystallized salts for the preparation of the solution, also the crotonylaminoarylarsonic acids in an aqueous suspension may be dissolved by addition of equivalent quantities of alkali, ammonia or organic bases, such as for instance diethyl-amino-ethanol and the solutions thus obtained which have an amphoteric reaction may be concentrated by addition of water, preferably after addition of small quantities of crystallized sodium sulfite. The solutions are colorless to feebly yellowish. By using instead of 1 mol of the base 2 mols thereof, solutions of the di-salts of the arsonic acids are obtained which have an alkaline reaction.

We claim:

1. Compounds of the following formula:

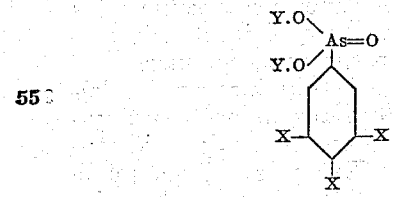

wherein one of the X's stands for the group $-NH.CO.CH=CH.CH_3$, the other X's for hydrogen, chlorine or the hydroxy group and Y for hydrogen, an alkali metal, or $NH_4$ wherein three of the hydrogen atoms may be substituted by two ethyl groups and one hydroxyethyl group being products of therapeutically valuable properties.

2. Compounds of the following formula:

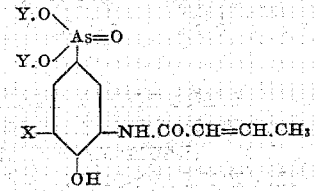

wherein X stands for hydrogen or chlorine and Y for hydrogen, an alkali metal, or $NH_4$ wherein three of the hydrogen atoms may be substituted by two ethyl groups and one hydroxyethyl group being products of therapeutically valuable properties.

3. Compounds of the following formula:

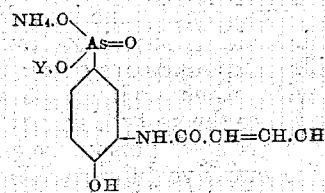

wherein Y stands for hydrogen or the group $NH_4$, being products of therapeutically valuable properties.

4. The mono-ammonium-salt of the 4-hydroxy-3-crotonylamino-benzene-arsonic acid being a faintly yellowish crystallized powder, easily soluble in water, nearly insoluble in acetone or ether and having therapeutically valuable properties.

In testimony whereof, we affix our signatures.

KARL STREITWOLF.
ALFRED FEHRLE.
WALTER HERRMANN.